Oct. 12, 1926.

L. H. WILKINSON ET AL 1,602,804

ELECTRIC HEATING DEVICE

Filed Jan. 7, 1926

INVENTORS
L. H. WILKINSON.
A. M. YOUNG.

BY
ATTORNEYS

Patented Oct. 12, 1926.

1,602,804

UNITED STATES PATENT OFFICE.

LOUIS H. WILKINSON AND ALLAN M. YOUNG, OF MERIDEN, CONNECTICUT, ASSIGNORS, BY MESNE ASSIGNMENTS, TO MANNING, BOWMAN & CO., OF WILMINGTON, DELAWARE, A CORPORATION OF DELAWARE.

ELECTRIC HEATING DEVICE.

Application filed January 7, 1926. Serial No. 79,736.

Our invention relates to heating devices, and has special reference to such devices that are in the form of electric toasters.

An object of the invention is to provide a device of this character of novel and improved construction.

Another object of the invention is to provide an electric heating device in which the heating unit is mounted and arranged in a novel and improved manner whereby it may be easily assembled and taken apart.

Figure 1:
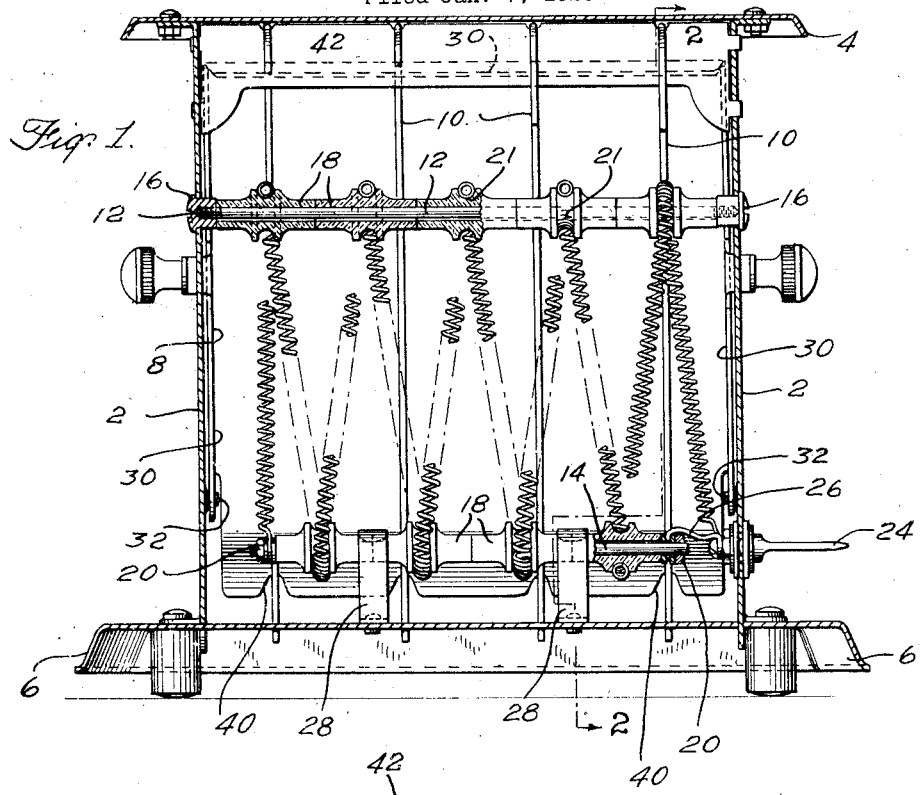
Figure 2:
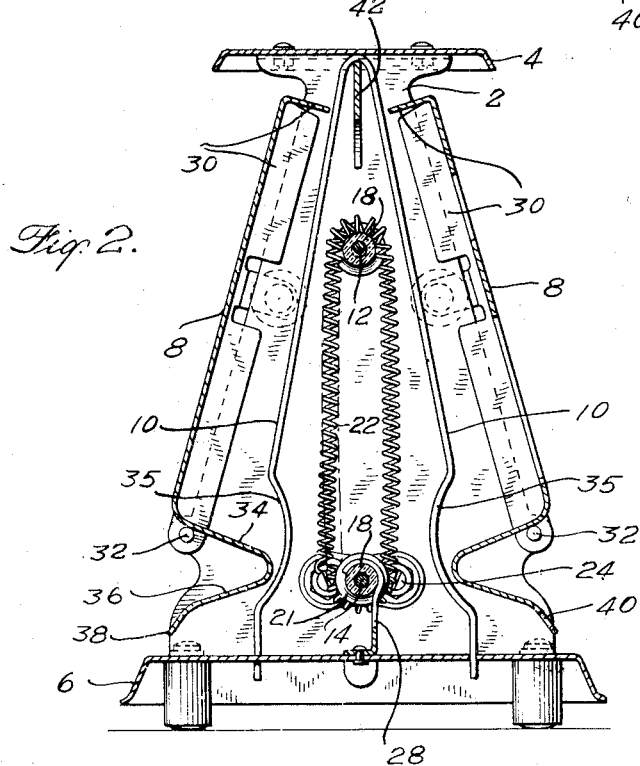

The several features of the invention, whereby the above mentioned and other objects may be attained, will be clearly understood from the following description and accompanying drawings, in which:

Figure 1 is a longitudinal sectional elevation of an electric toaster of the reversible type embodying the features of the invention in their preferred form; and Fig. 2 is a sectional view taken substantially on the line 2—2 of Fig. 1.

The electric toaster illustrated in the drawings is provided with a casing of sheet metal having upright end walls 2, a top wall 4 extending over and secured to the upper ends of said end walls, and a bottom wall or base 6 to which the lower ends of said end walls are secured. The sides of the casings are adapted to be opened and closed by means of doors 8, which serve to hold the slices of bread while being toasted against guard wires 10, and are so constructed as to reverse the position of the toast upon opening and closing them.

The heating unit of the toaster is mounted on two rods 12 and 14 which are arranged parallel one above the other, with the upper rod 12 arranged near the top of the toaster casing and the lower rod 14 spaced from the base 6. The upper rod 12 is secured to the end walls 2 of the casing by means of headed screw nuts 16 which extend through apertures in the end walls and are screw-threaded on the ends of the rod. The lower rod 14 has its ends spaced from the end walls of the casing, and is held in position by means hereinafter described.

A plurality of spool-like members 18 of insulating material are mounted end to end on each rod 12 and 14. These members 18 on the upper rod 12 are held between the nuts 16, and on the lower rod 14 are held between nuts 20 screw-threaded on the ends thereof. Each member 18 is in the form of a sleeve which has an enlarged central portion provided with an annular groove 21. The members 18 on the two rods are arranged in staggered relation.

The heating unit comprises a coiled resistance wire 22. One end of this resistance wire is secured by the nuts 20 to the left hand end of the lower rod 14, viewing Fig. 1, so as to be electrically connected with the rod. The resistance wire extends from said end of the lower rod 14 over the left end member 18 on the upper rod 12, then downwardly beneath the left end member 18 on the rod 14, and then upwardly over the next adjacent member 18 on the rod 12, the wire being thus looped alternately over the members 18 on the two rods. The other end of the resistance wire is electrically connected with one of two terminal members 24 that are mounted on and insulated from the right hand end wall 2 of the toaster casing. The other terminal member 24 is electrically connected with the right hand end of the lower rod 14 by means of a wire 26 which is secured to the rod by the nuts 20 on that end of the rod.

The lower rod 14 is held in position by hook-like members 28 that consist of sheet metal strips which have their lower ends secured to the base of the toaster and have their upper ends bent in an arc so as to fit over the end portions of members 18 on the rod, each hook member 28 being arranged between the grooves of two adjacent members 18.

The lower rod 14 and the spools mounted thereon are held upwardly against the curved ends of the members 28, by the coiled resistance wire which is placed under sufficient tension to securely hold the rod in place.

With this construction it will be apparent that the resistance wire may be easily removed and replaced upon merely disengaging the lower rod from the holding members 28, and disconnecting the ends of the wire from the end of the rod and terminal member 24, and this may be accomplished without disturbing other parts of the toaster. Also that upon removing the nuts 20, the members 18 on the lower rod 14 may be easily removed and replaced. The upper rod may be easily removed to permit removal and replacement of the members 18 thereon, upon screwing the nuts 16. It will also be apparent that the resistance wire and the lower rod 14 which forms a part of the electrical circuit, are well insulated from the casing and the other parts of the toaster, and that the several stretches of the resistance wire are spaced considerable distances apart.

The doors 8 are made of sheet metal and each has its longitudinal and upper edges provided with inwardly turned flanges 30 which, when the door is closed, extend within the casing. Each door is hinged on the end walls 2 of the casing by means of pivot pins or rivets 32 that extend through ears on the end walls and through the lower ends of the longitudinal flanges 30. The inner or lower end of each door is provided with a shelf 34 integral therewith which is inclined downwardly and inwardly when the door is closed. The inner edge of the shelf works close to the guard wires 10, and in order to permit the shelf to be of the desired width and still clear the guard wires, the portions 35 of the guard wires adjacent to the shelf are bent inwardly in an arc substantially concentrically to the axis of the door hinge.

In order to substantially close the space beneath the shelf of each door, and to provide a more finished appearance to the toaster casing when the door is closed, a skirt 36 which forms a continuation of the inner edge of the shelf extends downwardly and outwardly and its outer edge portion 38 is bent downwardly so as to lie substantially in the plane of the door, the outer edge of the skirt being provided with clearance slots 40 to permit it to clear the guard wires when the door is opened.

The guard wires 10 are each of a more or less hairpin-like form, and has its ends extended through and secured in apertures in the base 6 and its upper or central portion extended over the upper edge of a sheet metal bar or strut 42 having its ends secured to the end walls 2 of the toaster casing, the upper edge of the strut being provided with slots to receive the guard wires. The legs of each guard wire are inclined outwardly toward their lower ends, and are spaced at opposite sides of the heating unit.

As will be evident to those skilled in the art, our invention permits various modifications without departing from the spirit thereof or the scope of the appended claims.

What we claim is:

1. A heating device having, in combination, a frame comprising spaced upright supports, two rods arranged substantially horizontally and spaced apart with the ends of the upper rod secured to and the ends of the lower rod insulated from said upright supports, spool-like members of insulating material arranged end to end on each of said rods, terminal members mounted on and insulated from said frame, and a coiled resistance wire alternately looped over said members on said rods, said wire having one end electrically connected with one end of the lower rod, and having its other end electrically connected with one of said terminal members, and the other end of said lower rod electrically connected with the other contact member.

2. A heating device having, in combination, a frame comprising spaced upright supports, a substantially horizontal support connecting the lower portions of said upright supports, two substantially horizontal rods arranged one above the other, the upper rod having its ends supported by said upright supports, members secured to said horizontal support and extended over the lower rod to hold it from upward movement, and a coiled resistance wire alternately looped over said rods and tending to press the lower rod upwardly against the overlying portions of said members.

3. A heating device having, in combination, a frame comprising spaced upright supports, a substantially horizontal support connecting the lower end portions of said upright supports, two rods arranged substantially horizontally and spaced apart with the ends of the upper rod secured to said upright supports and the ends of the lower rod spaced from said upright supports and spaced a distance above said horizontal support, spool-like members of insulating material arranged end to end on each of said rods, terminal members mounted on and insulated from said frame, hook-shaped members secured to said horizontal support and extended over certain of said insulated members on said lower rod to hold the lower rod from upward movement, and a coiled resistance wire alternately looped over said members on said rods, said wire having one end electrically connected with one end of the lower rod, and having its other end electrically connected with one of said terminal members, the other end of said lower rod being electrically connected with the other terminal member.

4. A toaster of the class described having a casing comprising end walls and a connecting bottom wall, and doors for closing the sides of the casing, each door being made of sheet metal hinged on said end walls on an axis spaced above said bottom wall, having an inwardly projecting shelf at its lower end, and a skirt forming a continuation of the inner edge of said shelf and extending downwardly and outwardly with its outer edge arranged in proximity to the plane of the outer side of the door and in proximity to said bottom wall.

5. An electric toaster of the class described having a casing provided with upright end walls and top and bottom walls, an electrical heating unit extending between said end walls, a flat supporting bar vertically arranged and extending between said end walls with its upper edge arranged adjacent to said top wall, and guard wires spaced apart, each being of substantially hair-pin-like shape with its ends secured to said bottom wall and with its central bend extending over the upper edge of said supporting bar, the legs of each of said guard wires being arranged at opposite sides of said heating unit.

6. An electric toaster of the class described having a casing provided with upright end walls and top and bottom walls, an electrical heating unit extending between said end walls, a supporting bar extending between said end walls with its upper edge arranged adjacent to said top wall, guard wires spaced apart each being of substantially hair-pin-like shape with its ends secured to said bottom wall and with its central bend extending over the upper edge of said supporting bar, the legs of each of said guard wires being arranged at opposite sides of said heating unit and having inwardly curved portions adjacent to their lower ends, and doors for the sides of the casing having shelves adjacent to said curved portions of said guard wires and entering the recesses formed thereby when the doors are closed.

In testimony whereof, we have signed our names to this specification this 5th day of January, 1926.

LOUIS H. WILKINSON.
ALLAN M. YOUNG.